US012426121B2

United States Patent
Jin et al.

(10) Patent No.: US 12,426,121 B2
(45) Date of Patent: Sep. 23, 2025

(54) METHOD AND DEVICE FOR PROCESSING DOWNLINK RRC SEGMENT MESSAGE IN NEXT-GENERATION MOBILE COMMUNICATION SYSTEM

(71) Applicant: Samsung Electronics Co., Ltd., Gyeonggi-do (KR)

(72) Inventors: Seungri Jin, Gyeonggi-do (KR); Soenghun Kim, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 377 days.

(21) Appl. No.: 17/912,699

(22) PCT Filed: Apr. 6, 2021

(86) PCT No.: PCT/KR2021/004252
§ 371 (c)(1),
(2) Date: Sep. 19, 2022

(87) PCT Pub. No.: WO2021/206405
PCT Pub. Date: Oct. 14, 2021

(65) Prior Publication Data
US 2023/0180337 A1 Jun. 8, 2023

(30) Foreign Application Priority Data
Apr. 7, 2020 (KR) .................. 10-2020-0042401

(51) Int. Cl.
*H04W 76/20* (2018.01)
*H04W 8/22* (2009.01)

(52) U.S. Cl.
CPC ............. *H04W 76/20* (2018.02); *H04W 8/22* (2013.01)

(58) Field of Classification Search
CPC ....... H04W 8/22; H04W 76/20; H04W 28/06; H04W 76/19; H04W 8/24; H04W 76/15
See application file for complete search history.

(56) References Cited

U.S. PATENT DOCUMENTS

| 2015/0215987 A1* | 7/2015 | Kim | H04W 76/20 370/329 |
| 2019/0380128 A1* | 12/2019 | Park | H04W 88/10 |

(Continued)

FOREIGN PATENT DOCUMENTS

| KR | 10-2019-0069373 | 6/2019 |
| KR | 10-2021-0099961 | 8/2021 |
| WO | WO 2020/063444 | 4/2020 |

OTHER PUBLICATIONS

PCT/ISA/210 Search Report issued on PCT/KR2021/004252, Jul. 9, 2021 pp. 7.

(Continued)

*Primary Examiner* — Congvan Tran
(74) *Attorney, Agent, or Firm* — The Farrell Law Firm, P.C.

(57) ABSTRACT

The present disclosure relates to: a communication technology merging IoT technology with a 5th generation (5G) or pre-5G communication system for supporting a data transmission rate higher than that of a 4th generation (4G) communication system such as long term evolution (LTE); and a system thereof. The present disclosure can be applied to intelligent services (for example, smart homes, smart buildings, smart cities, smart cars or connected cars, healthcare, digital education, retail, security- and safety-related services, and the like) on the basis of 5G communication technology and IoT-related technology. According to various embodiments of the present disclosure, a method and a device for processing a downlink RRC segment message in a next-generation mobile communication system can be provided.

14 Claims, 12 Drawing Sheets

(56) References Cited

U.S. PATENT DOCUMENTS

| | | | | |
|---|---|---|---|---|
| 2020/0137675 A1* | 4/2020 | Park | .................... | H04W 68/005 |
| 2020/0187088 A1* | 6/2020 | Chun | .................... | H04W 48/02 |
| 2020/0221329 A1* | 7/2020 | Kim | .................... | H04W 12/037 |
| 2022/0086625 A1* | 3/2022 | Jin | ........................ | H04W 72/04 |
| 2022/0408311 A1* | 12/2022 | Bergstrom | ............ | H04W 76/19 |

OTHER PUBLICATIONS

PCT/ISA/237 Written Opinion issued on PCT/KR2021/004252, Jul. 9, 2021, pp. 5.
Ericsson et al., "Introduction of DL RRC segmentation", R2-2002159, 3GPP TSG-RAN2 Meeting #109-e, Online, Mar. 11, 2020, pp. 946.
Mediatek Inc et al., "Introduction of RACS and Dl Rrc segmentation", R2-2001687, 3GPP TSG-RAN 2 Meeting #109e, Online, Mar. 11, 2020, pp. 6.
Qualcomm Incorporated, "Considerations on RRC message segmentation", R2-1900536, 3GPP TSG-RAN WG2 Meeting #105, Athens, Greece, Feb. 14, 2019, pp. 4.
3GPP TS 38.331 V16.9.0 (Jun. 2022) 3rd Generation Partnership Project; Technical Specification Group Radio Access Network; NR; Radio Resource Control (RRC) protocol specification (Release 16), pp. 971.
Korean Office Action dated Jun. 19, 2025 issued in counterpart application No. 10-2020-0042401, 7 pages.

* cited by examiner

METHOD AND DEVICE FOR PROCESSING DOWNLINK RRC SEGMENT MESSAGE IN NEXT-GENERATION MOBILE COMMUNICATION SYSTEM

PRIORITY

This application is a National Phase Entry of PCT International Application No. PCT/KR2021/004252, which was filed on Apr. 6, 2021, and claims priority to Korean Patent Application No. 10-2020-0042401, which was filed on Apr. 7, 2020, the entire content of each of which is incorporated herein by reference.

TECHNICAL FIELD

The disclosure relates to a mobile communication system, and particularly to a method for segmenting and transferring, by a base station, a downlink RRC reconfiguration message, and an operation of a UE having received the same.

BACKGROUND ART

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE system." Implementation of the 5G communication system in ultrahigh frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems.

In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like.

In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed. In the 5G system, support of various services is under consideration against the existing 4G system. For example, the most representative services may include services of enhanced mobile broad band (eMBB), ultra-reliable and low latency communication (URLLC), massive machine type communication (mMTC), and evolved multimedia broadcast/multicast service (eMBMS). In addition, a system for providing the URLLC service may be called an URLLC system, and a system for providing the eMBB service may be called an eMBB system. Further, the terms "service" and "system" may be interchangeably used.

Among them, the URLLC service, unlike the existing 4G system, is a service having been newly considered in the 5G system, and requires satisfaction of ultrahigh reliability (e.g., packet error rate of about 10) and low latency (e.g., about 0.5 msec) conditions as compared with other services. In order to satisfy such strict requirements, the URLLC service may require application of a transmission time interval (TTI) that is shorter than the TTI of the eMBB service, and various operation methods to utilize this have been considered.

On the other hand, the Internet is evolving from a human-centered connection network where humans generate and consume information to an Internet of Things (IoT) network that exchanges and processes information between distributed components such as things. The Internet of everything (IoE) technology, which is a combination of IoT technology and big data processing technology through connection with a cloud server, has also emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently being studied.

Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by techniques of beamforming, MIMO, and array antennas, which correspond to the 5G communication technology. Application of a cloud radio access network (cloud RAN) as the above-described big data processing technology may also be considered to be an example of convergence between the 5G technology and the IoT technology.

DISCLOSURE OF INVENTION

Technical Problem

In a series of procedures in which a UE receives a request for UE capability from a base station and sends a report to the base station in an NR system, a method for segmenting and transferring a UE capability information message in case that UE capability information exceeds the maximum size of a PDCP service data unit (SDU) may be introduced. Likewise, even in case of a radio resource control (RRC) message for a downlink, a case may occur, in which configuration information exceeds the maximum PDCP SDU size. Further, in case that segmentation of a downlink RRC message is allowed, an operation of a UE for supporting this may be necessary. In particular, when an operation for generating an RRC reestablishment is triggered in the UE, an operation of the UE for processing a segmented RRC message that is stored in an RRC layer of the UE may be necessary.

Technical problems intended to be solved in the disclosure are not limited to the above-mentioned technical problems, and other unmentioned technical problems will be able to be clearly understood by those of ordinary skill in the art to which the disclosure pertains from the following description.

Solution to Problem

According to the disclosure to solve the above-described problems, a method performed by a UE in a wireless communication system includes: receiving, from a base station, a request message for a report of capability information of the UE; transmitting, to the base station, a response message including an indicator for indicating whether the UE supports segmentation of a downlink radio resource control (RRC) message in response to the request message; receiving, from the base station, a segmentation message for the downlink RRC message; and determining whether to discard or keep the received segmentation message in accordance with predetermined criteria in case that an event related to RRC reestablishment occurs before a last segment message for the downlink RRC message is received.

Further, according to another embodiment of the disclosure, a method performed by a base station in a wireless communication system includes: transmitting, to a UE, a request message for a report of capability information of the UE; receiving, from the UE, a response message including an indicator for indicating whether the UE supports segmentation of a downlink radio resource control (RRC) message in response to the request message; generating the downlink RRC message; generating a segment message for the downlink RRC message in case that a size of the downlink RRC message is larger than a predetermined size based on the indicator; and transmitting, to the UE, the segment message for the downlink RRC message, wherein the segment message is discarded or kept in accordance with predetermined criteria in case that an event related to RRC reestablishment occurs before a last segment message for the downlink RRC message is transmitted.

Further, according to still another embodiment of the disclosure, a UE in a wireless communication system includes: a transceiver; and a controller configured to: control to receive, from a base station, a request message for a report of capability information of the UE through the transceiver, control to transmit, to the base station, a response message including an indicator for indicating whether the UE supports segmentation of a downlink radio resource control (RRC) message in response to the request message through the transceiver, control to receive, from the base station, a segmentation message for the downlink RRC message through the transceiver, and determine whether to discard or keep the received segmentation message in accordance with predetermined criteria in case that an event related to RRC reestablishment occurs before a last segment message for the downlink RRC message is received.

Further, according to yet still another embodiment of the disclosure, a base station in a wireless communication system includes: a transceiver; and a controller configured to: control to transmit, to a UE, a request message for a report of capability information of the UE through the transceiver, control to receive, from the UE, a response message including an indicator for indicating whether the UE supports segmentation of a downlink radio resource control (RRC) message in response to the request message through the transceiver, control to generate the downlink RRC message, control to generate a segmentation message for the downlink RRC message in case that a size of the downlink RRC message is larger than a predetermined size based on the indicator, control to transmit, to the UE, the segmentation message for the downlink RRC message through the transceiver, and control to discard or keep the segmentation message in accordance with predetermined criteria in case that an event related to RRC reestablishment occurs before a last segmentation message for the downlink RRC message is transmitted.

Advantageous Effects of Invention

According to an embodiment of the disclosure, since the downlink segmented RRC message is introduced in the NR system, it is possible to generate and transfer even the downlink RRC message that exceeds the maximum PDCP SDU size. Further, in case that the operation of generating the RRC reestablishment is triggered in the UE, it becomes clear how to process the segmented RRC message that is stored in the RRC layer of the UE, and thus it is not required to store the unnecessary message in the buffer of the UE, so that efficiency can be brought in the buffer management of the UE.

Effects that can be obtained in the disclosure are not limited to the above-mentioned effects, and other unmentioned effects will be able to be clearly understood by those of ordinary skill in the art to which the disclosure pertains from the following description.

MODE FOR THE INVENTION

Hereinafter, an operation principle of the disclosure is described in detail with reference to the accompanying drawings. In describing the disclosure, a detailed description of a related known function or configuration will be omitted if it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be defined based on contents over the entire specification. In the following description, a term to identify an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used.

For convenience in explanation, in the disclosure, terms and names defined in the 3rd Generation Partnership Project Long Term Evolution (3GPP LTE) standards are used.

However, the disclosure is not restricted by the terms and names, and it may be equally applied to systems complying with other standards.

Figure 1:
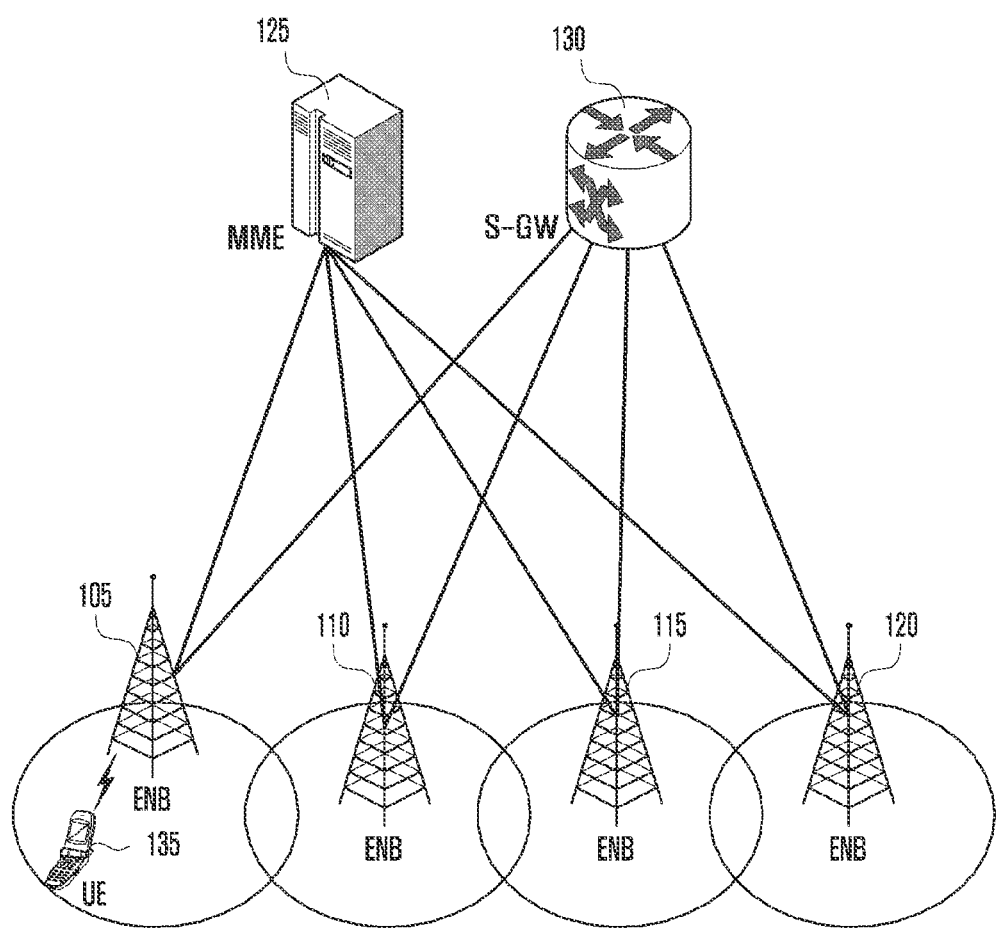
FIG. 1 is a diagram illustrating the structure of an LTE system according to an embodiment of the disclosure.

FIG. 1 is a diagram illustrating the structure of an LTE system according to an embodiment of the disclosure.

With reference to FIG. 1, a radio access network of an LTE system may be composed of evolved node Bs (hereinafter referred to as "eNBs", "node Bs", or "base stations") 105, 110, 115, and 120, a mobility management entity (MME) 125, and a serving-gateway (S-GW) 130. User equipment (hereinafter referred to as "UE" or "terminal") 135 may access an external network through the eNBs 105 to 120 and the S-GW 130.

In FIG. 1, the eNBs 105 to 120 correspond to existing node Bs of a UMTS system. The eNBs 105 to 120 may be connected to the UE 135 on a radio channel, and play more complicated roles than those of the existing node Bs. In the LTE system, since all user traffics including a real-time service, such as a voice over IP (VoIP) through an Internet protocol, are serviced on shared channels, entities performing scheduling through gathering of state information, such as a buffer state, an available transmission power state, and a channel state of UEs 135, are necessary, and the eNBs 105 to 120 may take charge of this. In general, one eNB 105 to 120 may control a plurality of cells. For example, in order to implement a transmission speed of 100 Mbps, the LTE system may use, for example, orthogonal frequency division multiplexing (hereinafter, referred to as "OFDM") as a radio access technology in a bandwidth of 20 MHz. Further, the LTE system may adopt an adaptive modulation & coding (hereinafter, referred to as "AMC") scheme that determines a modulation scheme and a channel coding rate to match the channel state of the UE 135. The S-GW 130 is an entity that provides a data bearer, and may generate or remove the data bearer under the control of the MME 125. The MME 125 is an entity that takes charge of not only a mobility management function for the UE 135 but also various kinds of control functions, and may be connected to the plurality of base stations 105 to 120.

Figure 2:
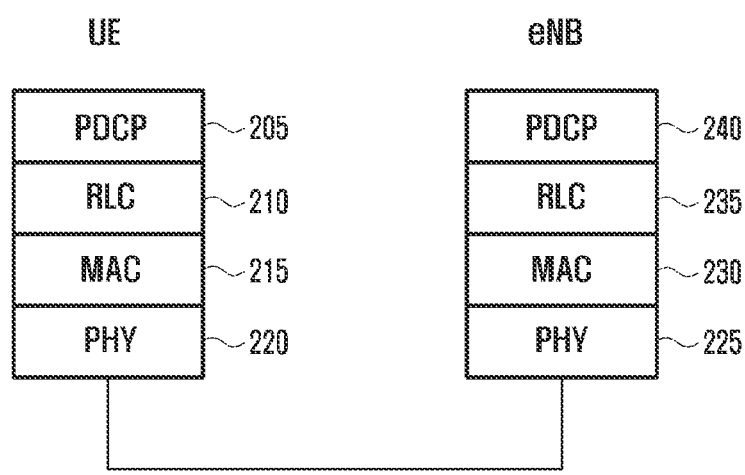
FIG. 2 is a diagram illustrating a radio protocol structure in an LTE system according to an embodiment of the disclosure.

FIG. 2 is a diagram illustrating a radio protocol structure in an LTE system according to an embodiment of the disclosure.

With reference to FIG. 2, in a UE or an eNB, a radio protocol of an LTE system is composed of a PDCP 205 or 240, a radio link control (RLC) 210 or 235, and a medium access control (MAC) 215 or 230. The packet data convergence protocol (PDCP) 205 or 240 may take charge of TP header compression/decompression operations. The main functions of the PDCP 205 or 240 may be summarized as follows.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink Radio link control (hereinafter, referred to as "RLC") 210 or 235 may perform an ARQ operation by reconfiguring a PDCP protocol data unit (PDCP PDU) with a suitable size. Main functions of the RLC 210 or 235 may be summarized as follows.

Transfer of upper layer PDUs
Error correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 215 or 230 is connected to several RLC layer devices configured in one UE, and may perform multiplexing of RLC PDUs into the MAC PDU and demultiplexing of RLC PDUs from the MAC PDU. The main functions of the MAC 215 or 230 may be summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding The physical layer 220 or 225 may perform channel coding and modulation of upper layer data and make OFDM symbols to transmit the OFDM symbols on a radio channel, or may perform demodulation and channel decoding of the OFDM symbols received on the radio channel and transfer the OFDM symbols to an upper layer. Further, for additional error correction even in the physical layer 220 or 225, a hybrid ARQ (HARQ) may be used, and a receiving end may transmit whether to receive a packet transmitted from a transmitting end by 1 bit. This may be referred to as "HARQ ACK/NACK information". Downlink HARQ ACK/NACK information for uplink transmission may be transmitted on a physical hybrid-ARQ indicator channel (PHICH) physical channel, and uplink HARQ ACK/NACK information for downlink transmission may be transmitted on a physical uplink control channel (PUCCH) or a physical uplink shared channel (PUSCH) physical channel.

Meanwhile, the PHY layer 220 or 225 may be composed of one or a plurality of frequencies/carriers, and a technology to simultaneously configure and use a plurality of frequencies may be carrier aggregation (hereinafter, referred to as "CA"). The CA technology may dramatically increase an amount of transmission as many as the number of subcarriers by additionally using one primary carrier and one or a plurality of secondary carriers in addition to only one carrier that is used for communication between user equipment (UE) and a base station (E-UTRAN NodeB or eNB). Meanwhile, in an LTE, a cell in a base station that uses a primary carrier may be called "primary cell (PCell)", and a secondary carrier may be called "secondary cell (SCell)".

Although not illustrated in the drawing, on upper sides of PDCP layers of the UE and the base station, radio resource control (hereinafter, may be referred to as "RRC") layers may exist, and the RRC layers may send and receive access and measurement related configuration control messages with each other for radio resource control.

Figure 3:
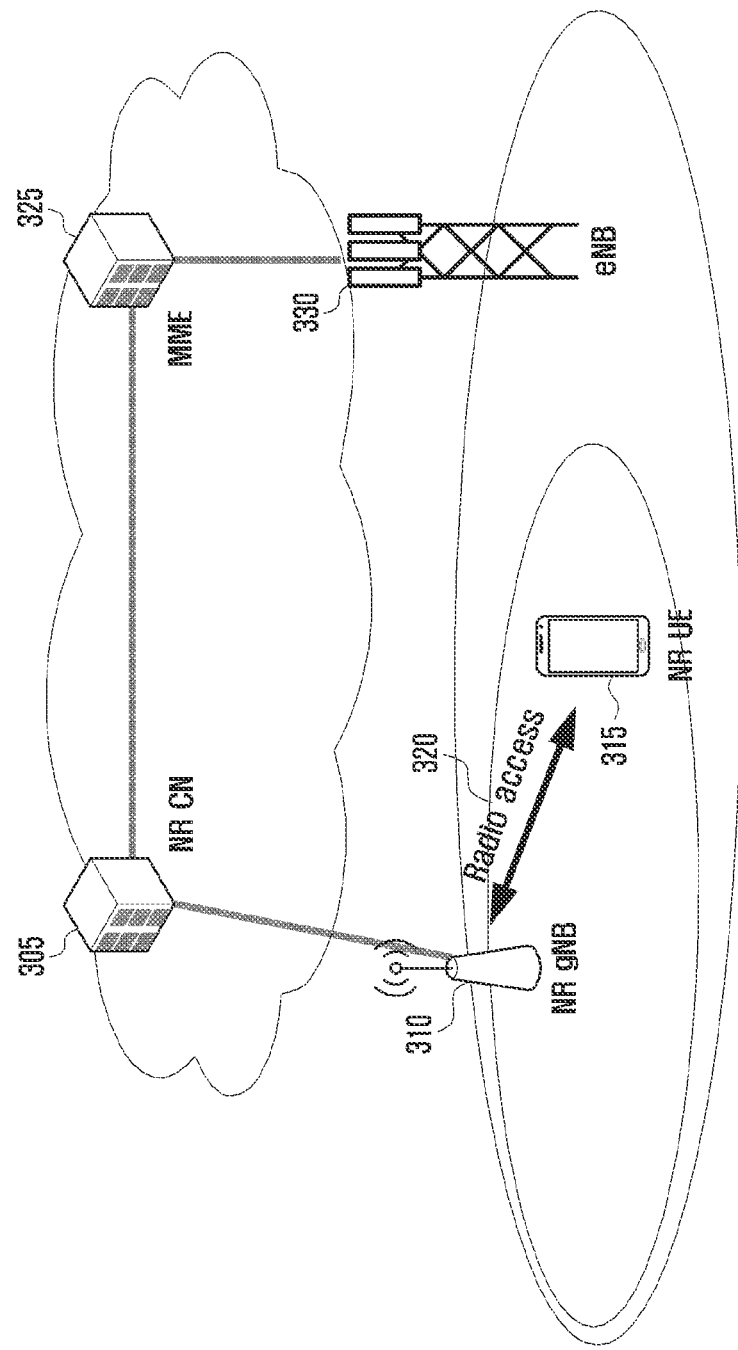
FIG. 3 is a diagram illustrating the structure of a next-generation mobile communication system according to an embodiment of the disclosure.

FIG. 3 is a diagram illustrating the structure of a next-generation mobile communication system according to an embodiment of the disclosure.

With reference to FIG. 3, a radio access network of the next-generation mobile communication system may be composed of a new radio node B (hereinafter, NR NB or gNB) 310 and a new radio core network (NR CN) or next generation core network (NG CN) 305. A new radio user equipment (hereinafter, NR UE or UE, or terminal) 315 may access an external network through the NR NB 310 and the NR CN 305.

In FIG. 3, the NR NB 310 may correspond to an evolved Node B (eNB) of the existing LTE system. The NR NB 310 is connected to the NR UE 315 on a radio channel, and thus can provide a more superior service than the service of the existing Node B. In the next-generation mobile communication system, all user traffics are serviced on shared channels, and thus there is a need for a device that performs scheduling through consolidation of state information, such as a buffer state of UEs 315, an available transmission power state, and a channel state, and the NR NB 310 may take charge of this. In general, one NR NB 310 may control a plurality of cells. In order to implement ultrahigh-speed data transmission as compared with the existing LTE, a bandwidth that is equal to or higher than the existing maximum bandwidth may be applied, and a beamforming technology may be additionally used in consideration of the orthogonal frequency division multiplexing (OFDM) as a radio access technology. Further, an adaptive modulation & coding (AMC) scheme that determines a modulation scheme and a channel coding rate to match the channel state of the UE 315 may be applied. The NR CN 305 may perform functions of mobility support, bearer setup, and QoS configuration. The NR CN 305 is a device that takes charge of not only a mobility management function for the UE 315 but also various kinds of control functions, and may be connected to a plurality of base stations 310. Further, the next-generation mobile communication system may interwork with the existing LTE system, and the NR CN 305 may be connected to an MME 325 through a network interface. The MME 325 may be connected to an eNB 330 that is the existing base station.

Figure 4:
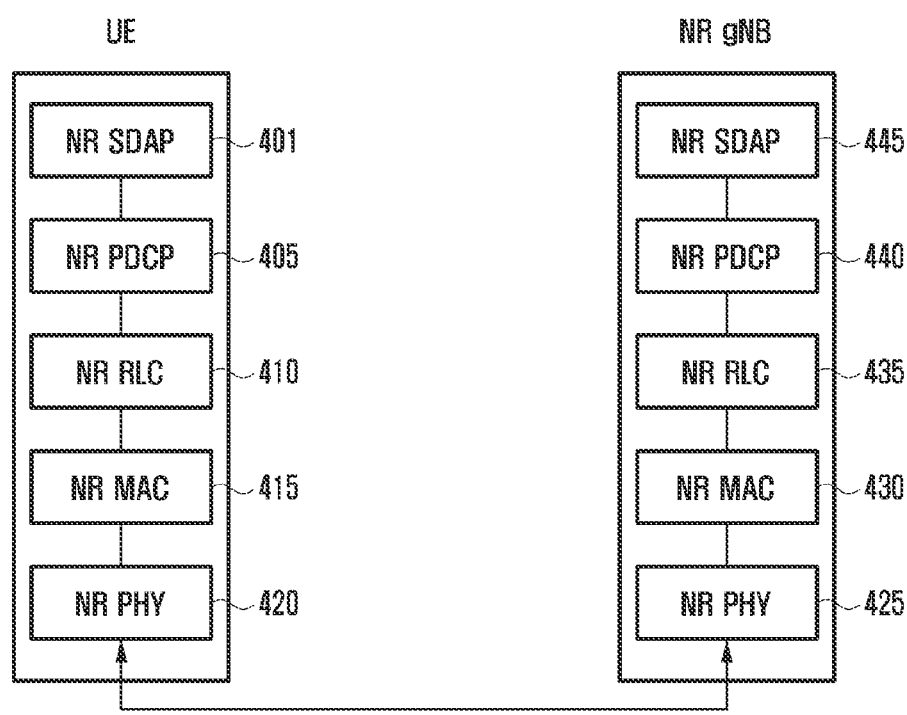
FIG. 4 is a diagram illustrating a radio protocol structure of a next-generation mobile communication system according to an embodiment of the disclosure.

FIG. 4 is a diagram illustrating a radio protocol structure of a next-generation mobile communication system according to an embodiment of the disclosure.

With reference to FIG. 4, in the UE or NR base station, a radio protocol of the next-generation mobile communication system may include an NR SDAP 401 or 445, an NR PDCP 405 or 440, an NR RLC 410 or 435, and an NR MAC 415 or 430.

The main functions of the NR SDAP 401 or 445 may include some of the following functions.

Transfer of user plane data
   Mapping between a QoS flow and a DRB for both DL and UL
   Marking QoS flow ID in both DL and UL packets and reflective QoS flow to DRB mapping for the UL SDAP PDUs With respect to the SDAP layer device, the UE may be configured whether to use a header of the SDAP layer device or whether to use the function of the SDAP layer device for each PDCP layer device, bearer, or logical channel through an RRC message, and if the SDAP header is configured, it may be indicated that the UE can update or reconfigure mapping information on the uplink and downlink QoS flow and the data bearer through a NAS QoS reflective configuration 1-bit indicator (NAS reflective QoS) of the SDAP header and an AS QoS reflective configuration 1-bit indicator (AS reflective QoS). The SDAP header may include QoS flow ID information indicating the QoS. The QoS information may be used as a data processing priority for supporting a smooth service, scheduling information, and the like.

The main functions of the NR PDCP 405 or 440 may include some of the following functions.

Header compression and decompression: ROHC only
   Transfer of user data
   In-sequence delivery of higher layer PDUs
   Out-of-sequence delivery of higher layer PDUs
   PDCP PDU reordering for reception
   Duplicate detection of lower layer SDUs
   Retransmission of PDCP SDUs
   Ciphering and deciphering
   Timer-based SDU discard in an uplink As described above, reordering of the NR PDCP device may mean reordering of PDCP PDUs received from a lower layer based on PDCP sequence numbers (SNs), and may include transfer of data to an upper layer in the order of reordering or immediate transfer without considering the order, and may include recording of lost PDCP PDUs through rearrangement of the order, status report for the lost PDCP PDUs to a transmitting side, and retransmission request for the lost PDCP PDUs.

The main functions of the NR RLC 410 or 435 may include some of the following functions.

Transfer of upper layer PDUs
   In-sequence delivery of higher layer PDUs
   Out-of-sequence delivery of higher layer PDUs
   Error correction through an ARQ
   Concatenation, segmentation, and reassembly of RLC SDUs
   Re-segmentation of RLC data PDUs
   Reordering of RLC data PDUs
   Duplicate detection
   Protocol error detection RLC SDU discard
RLC reestablishment As described above, in-sequence delivery of the NR RLC device may mean in-sequence delivery of RLC SDUs received from a lower layer to an upper layer. In case that one original RLC SDU is segmented into several RLC SDUs to be received, the in-sequence delivery of the NR RLC device may include reassembly and delivery of the RLC SDUs, reordering of the received RLC PDUs based on an RLC sequence number (SN) or a PDCP sequence number (SN), recording of lost RLC PDUs through reordering, status report for the lost RLC PDUs to a transmission side, retransmission request for the lost RLC PDUs. The in-sequence delivery of the NR RLC device may include in-sequence delivery of only RLC SDUs just before the lost RLC SDU to an upper layer if there is the lost RLC SDU, in-sequence delivery of all RLC SDUs received before a specific timer starts its operation to an upper layer if the timer has expired although there is the lost RLC SDU, or in-sequence delivery of all RLC SDUs received up to now to an upper layer if a specific timer has expired although there is the lost RLC SDU. The NR RLC device may process the RLC PDUs in the order of their reception (in the order of arrival, regardless of the order of a serial number or sequence number), and may transfer the processed RLC PDUs to the PDCP device in an out-of-sequence delivery manner. In case of receiving segments, the NR RLC device may receive the segments stored in a buffer or to be received later, reconfigure them as one complete RLC PDU, and then transfer the reconfigured RLC PDU to the PDCP device. The NR RLC layer may not include a concatenation function, and the function may be performed by an NR MAC layer or may be replaced by a multiplexing function of the NR MAC layer.

As described above, the out-of-sequence delivery of the NR RLC device may mean a function of transferring the RLC SDUs received from a lower layer directly to an upper layer regardless of their order, and if one original RLC SDU is segmented into several RLC SDUs to be received, the out-of-sequence delivery of the NR RLC device may include reassembly and delivery of the RLC SDUs, and functions of storing and ordering the RLC SNs or PDCP SNs of the received RLC PDUs and recording of the lost RLC PDUs.

The NR MAC 415 or 430 may be connected to several NR RLC layer devices configured in one UE, and the main functions of the NR MAC may include some of the following functions.

Mapping between logical channels and transport channels
  Multiplexing/demultiplexing of MAC SDUs
  Scheduling information reporting
  HARQ function (error correction through HARQ)
  Priority handling between logical channels of one UE
  Priority handling between UEs by means of dynamic scheduling
  MBMS service identification
  Transport format selection
  Padding The NR PHY layer 420 or 425 may perform channel coding and modulation of upper layer data to configure and transmit OFDM symbols on a radio channel, or may perform demodulation and channel decoding of the OFDM symbols received on the radio channel to transfer the demodulated and channel-decoded symbols to an upper layer.

Figure 5:
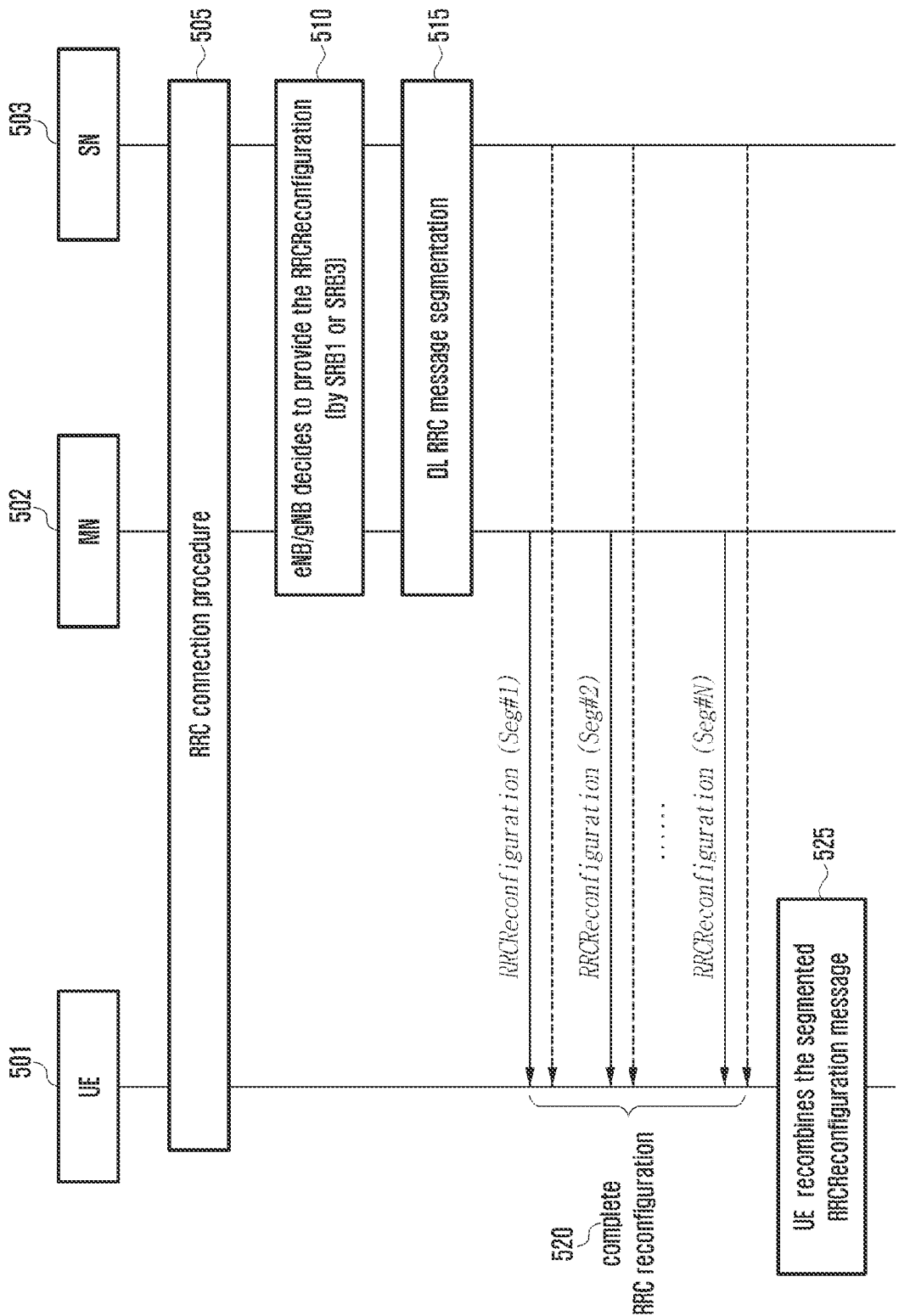
FIG. 5 is a diagram illustrating operations among a UE, a master node (MN) base station, and a secondary node (SN) base station in order to apply segmentation to an RRC control message through a downlink in an NR system according to an embodiment of the disclosure.

FIG. 5 is a diagram illustrating operations among a UE, a master node (MN) base station, and a secondary node (SN) base station in order to apply segmentation to an RRC control message through a downlink in an NR system according to an embodiment of the disclosure.

As an example of the RRC control message, an RRCReconfiguration message and an RRCResume message may be possible, and the RRC control message may be a specific downlink RRC control message that requires segmentation due to its large size. In an embodiment of the disclosure, the RRCReconfiguration will be generalized and explained. Basically, a UE 501 is required to receive configuration information for data transmission/reception with a base station in a state (505) of being connected to a serving base station (eNB or gNB) 502. At operation 510, the base station 502 or 503 may determine that it should transfer an RRCReconfiguration message to the UE 501, and may generate the corresponding information. In a state where dual connectivity (hereinafter, named "DC") is configured as shown in FIG. 5, the following cases case 1, case 2, and case 3 may occur depending on how the RRCReconfiguration is transferred.

Case 1: In case that a master node (MN) generates an RRC message including master cell group (MCG) configuration information, the base station may transfer the generated RRC message through SRB1.
  Case 2: In case that the MN is transferred with secondary node (SN) configuration information and generates the RRC message including MCG/SCG configuration information, the base station may transfer the generated RRC message through SRB1.
  Case 3: In case that the SN generates the RRC message including secondary cell group (SCG) configuration information, the base station may transfer the generated RRC message through SRB3.

At operation 515, if the RRC control message generated at operation 510 exceeds 9000 bytes that correspond to the maximum size of the PDCP SDU, the base station may apply segmentation with respect to the corresponding RRC control message (e.g., RRCReconfiguration message). That is, the entire RRCReconfiguration message may be segmented into segments having the size of 9000 bytes, and the last segment may be a segment having a remaining size obtained by subtracting the sum of segmented RRC message sizes from the RRC control message size (entire message size) generated at operation 510. At operation 520, the base station may transfer the generated segmented RRC messages (segmented RRCReconfiguration messages) to the UE one by one. In this case, the transferred segmented RRC messages should be sequentially transferred in accordance with the sequence numbers, and should not be interrupted by other RRC messages. That is, while the segmented RRC message is transferred, other RRC messages are not transferred. At operation 525, after receiving all the segmented RRC messages, the UE may recover the entire RRC message information by decoding and recombining the received segmented RRC messages.

Figure 6:
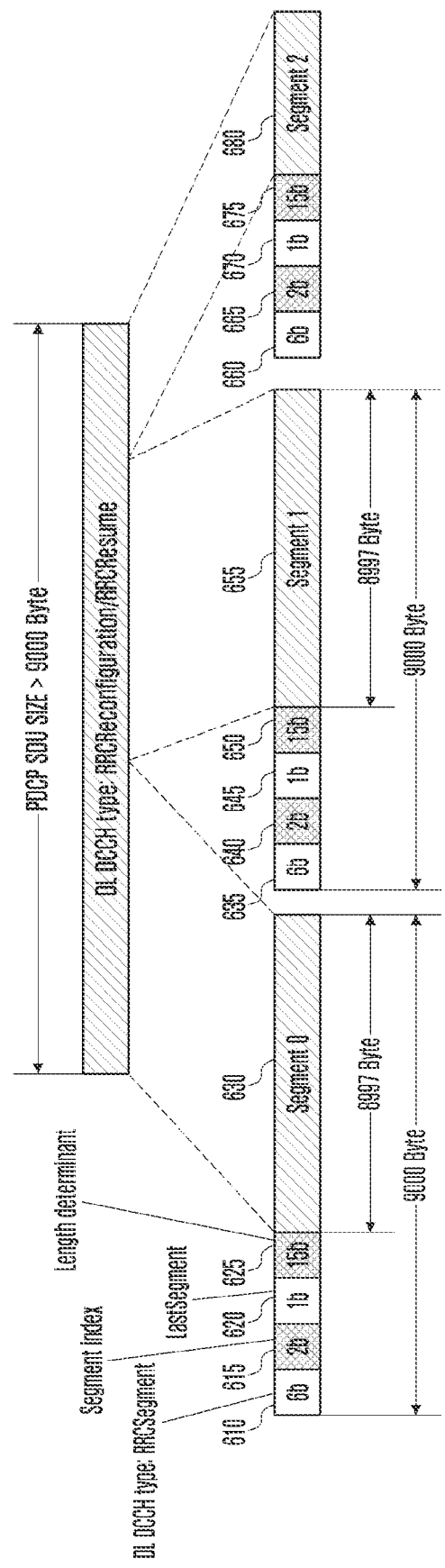
FIG. 6 is a diagram illustrating a method for applying segmentation to a downlink RRC message in an NR system according to an embodiment of the disclosure.

FIG. 6 is a diagram illustrating a method for applying segmentation to a downlink RRC message in an NR system according to an embodiment of the disclosure.

With reference to the drawing, the structure of a detailed segmented message will be described with an RRCReconfiguration message as an example.

In case of applying segmentation based on a DL DCCH message, a new downlink segmented RRC message may be introduced. As an example, a new DL DCCH message so called DLDedicatedMessageSegment may be introduced and used to transfer downlink segmented RRC. In case that a completed DL DCCH message 605, for example, a DL DCCH message including the RRCReconfiguration message exceeds 9000 bytes, a base station may apply segmentation so that the corresponding message is segmented into 8997 bytes as shown as 630 or 655, and a downlink segmented RRC message header of 3 bytes (24 bits) is added thereto. Here, the sizes of the RRC message header and the segmented RRC message are not predetermined, but may be varied in accordance with the size of an introduced field. The last segmented message 680 may have a size obtained by subtracting the sum of sizes of segments having a length of 9000 bytes from the total size.

The header of the downlink segmented RRC message requires 6 bits for DL DCCH type configuration (610, 635, and 660: the number of bits for a CHOICE structure and DLDedicatedMessageSegment message indication), and 2 bits for segment indexes 615, 640, and 665 used for a corresponding segmented UE capability information message. The segment index is an identifier that represents what segment number is the corresponding segmented RRC message, and if the segment index is 2 bits, it corresponds to a case where the maximum segment size is configured to 4, and the number of bits of the segment index may be varied in accordance with the maximum configuration value. Since the corresponding segment can be transferred in-sequence through a PDCP SN, the corresponding identifier may always been included, or may not exist. However, 1-bit indicator 620, 645, or 670 indicating whether a specific segment is the last segment should be included in the corresponding header. If the corresponding LastSegment indicator is indicated as 0 to indicate that the specific segment is not the last segment, it means that the corresponding packet is not the last segment, and the base station that receives the corresponding message may be aware that the corresponding packet has the maximum size. Further, a padding bit for byte-align of the packet may be added. The padding bit may be variable in accordance with the previous header bit and the segment size. Further, a length field (625, 650, or 675, length determinant) that indicates the length of the segmented RRC message requires 15 bits. This may mean the number of bits for representing 8997 bytes. In a method for filling the size, if the PDCP SDU size is set to 9000, the PDCP SN may be added, and the PDCP PDU may be generated.

The following embodiments of the disclosure propose operations of a UE and a base station according to situations that may occur during a segment operation in case that a downlink segment is applied to a downlink RRC control message, in particular, an RRC reconfiguration message and an RRC resume message. The above-described situations are related to an RRC reestablishment operation, and how the UE processes the corresponding RRC segment according to various situations for triggering this will be described.

Figure 7:
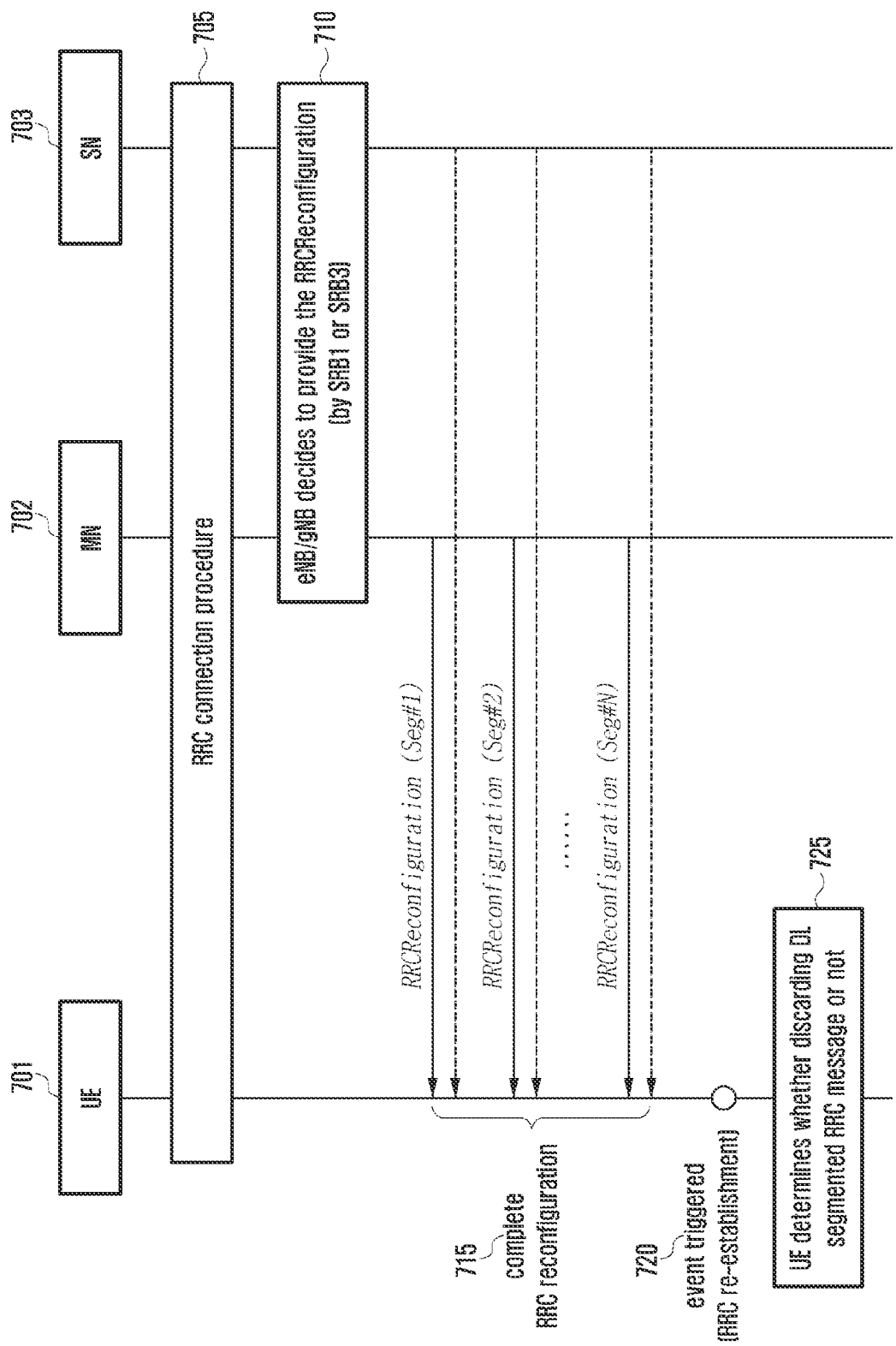
FIG. 7 is a diagram illustrating the entire operation in a situation where segmentation is applied to a downlink RRC message according to an embodiment of the disclosure, and specifically illustrating operations among a UE, a master node (MN) base station, and a secondary node (SN) base station in accordance with a specific situation.

FIG. 7 is a diagram illustrating the entire operation in a situation where segmentation is applied to a downlink RRC message according to an embodiment of the disclosure, and specifically illustrating operations among a UE, a master node (MN) base station, and a secondary node (SN) base station in accordance with a specific situation.

As an example of the RRC control message, an RRCReconfiguration message and an RRCResume message are possible, and a specific downlink RRC control message that requires segmentation due to its large size may be applied. In the disclosure, the RRCReconfiguration will be generalized and explained hereinafter.

Basically, a UE 701 is required to receive configuration information for data transmission/reception with a base station in a state (705) of being connected to a serving base station (eNB or gNB) 702. At the above operation, a status where dual connectivity (DC) is configured and the MN and the SN are in a connected state may be assumed. At step 710, the base station 702 or 703 may determine that it should transfer an RRCReconfiguration message to the UE 701, and may generate the corresponding information. In this case, an MN RRCReconfiguration message may be present in the RRCReconfiguration message generated by the MN, and an SN RRCReconfiguration message may be encapsulated. As shown in FIG. 7, in a state where the dual connectivity (hereinafter, referred to as "DC") is configured, the following cases may occur depending on how the RRCReconfiguration message is transferred.

Case 1: In case that a master node (MN) generates an RRC message including MCG configuration information, the base station may transfer the generated RRC message through SRB1.

Case 2: In case that the MN is transferred with secondary node (SN) configuration information and generates the RRC message including MCG/SCG configuration information, the base station may transfer the generated RRC message through SRB1.

Case 3: In case that the SN generates the RRC message including SCG configuration information, the base station may transfer the generated RRC message through SRB3.

At step 715, if the RRC control message generated at step 710 exceeds 9000 bytes that correspond to the maximum size of the PDCP SDU, the base station may apply segmentation with respect to the corresponding RRC control message (e.g., RRCReconfiguration message). That is, the entire RRCReconfiguration message may be segmented into segments having the size of 9000 bytes, and the last segment may be a segment having a remaining size obtained by subtracting the sum of segmented RRC message sizes segmented from the entire message size. In accordance with the above-described cases, the base station operation will be described in detail as follows.

Perform a segmentation operation for an RRCReconfiguration message generated by the MN (Case 1 and Case 2)

Check whether the generated RRC message is for the MN or the SN

In case of an RRC message for the MN,

Store/generate a segmented RRCReconfiguration message in DLDedicatedMessageSegment Transfer a plurality of DLDedicatedMessageSegment messages storing all the entire RRCReconfiguration to SRB1

Sequentially transfer the message without interrupting another DL RRC message through SRB1

Perform a segmentation operation for an RRCReconfiguration message generated by the SN (Case 3)

Check whether the generated RRC message is for the MN or the SN

In case that the RRC message is for the SN and SRB3 is configured,

Store/generate a segmented RRCReconfiguration message in DLDedicatedMessageSegment Transfer a plurality of DLDedicatedMessageSegment messages storing all the entire RRCReconfiguration to SRB3

Sequentially transfer the message without interrupting another DL RRC message through SRB3

As described above, at step 715, the base station may transfer the generated segmented RRC messages (segmented RRCReconfiguration messages) to the UE one by one through the configured SRB. In this case, the transferred segmented RRC messages should be sequentially transferred in accordance with the sequence numbers (or segmented indexes), and should not be interrupted by other RRC messages. That is, while the segmented RRC is transferred, other RRC messages are not transferred. However, as can be identified at step 525, the disclosure manages a case where other situations occur before all the segmented RRCs (DLDedicatedMessageSegments) are transferred. As an example, if N segmented RRC messages exist in all, this may correspond to a state where (N−1)-th segments have been transferred to the UE through the configured SRB, and the last N-th segmented RRC message has not been transferred. Further, the corresponding situation is not limited to the above example, and in case that N segmented RRC messages exist in all, this may correspond to even a case where the situation occurs before the N segmented RRC messages are transferred to the UE in all.

For reference, the case where the entire segmented RRC messages are safely transferred in all has been described with reference to FIG. 5. In the following embodiments, the following cases will be described in more detail, and with reference to this drawing, a simple operation will be described. Briefly, in the RRC layer of the current UE, since it is presumed that the RRC message is not stored, but is immediately processed in a manner that the RRC message is sent to a lower layer immediately upon occurrence, and is processed immediately upon reception, the RRC messages stored in the RRC layer have not been considered. However, as RRC segments are introduced, segments may be stored in the RRC layer of the UE, and since the stored segments correspond to a certain amount of information to occupy data, it may be necessary to explicitly discard the data on the RRC layer for a specific case.

As a specific embodiment, there may be a case where an RRC connection reestablishment (RRE) procedure is performed to recover a radio link problem and a specific operation failure in a situation where the UE is unable to have received all segmented RRC messages (720). As causes of starting the above RRC connection reestablishment procedure, the following situations may occur.

First cause: In case that a radio link failure (RLF) is detected in MCG (in case that fast MCG recovery has not been configured)

Second cause: In case that a reconfiguration with sync has failed in the MCG

Third cause: In case that mobility from an NR has failed

Fourth cause: In case that an integrity check failure indication for SRB1 or SRB2 is received from a lower layer (Except a case where the integrity check failure is detected in the RRCReestablishment message)

Fifth cause: In case that the RRC connection reconfiguration has failed

Sixth cause: In case that an RLF is detected in SCG while MCG transmission is suspended (NR-DC or NE-DC)

Seventh cause: In case that the reconfiguration with sync has failed while MCG transmission is suspended Eighth cause: In case that SCG change has failed while MCG transmission is suspended (NE-DC)

Ninth cause: In case that SCG configuration has failed while MCG transmission is suspended (NR-DC or NE-DC)

Tenth cause: In case that the integrity check failure indication for SRB3 is received from a lower layer while MCG transmission is suspended Eleventh cause: In case that T316 has expired As explanation of T316, [Table 1] below represents a guard timer until a next operation is performed after the MCG failure message is transferred, and in case that the MCG transmission is resumed before the expiration of the corresponding timer, the RRCRelease message is received, or the RRC reestablishment procedure starts, the corresponding timer may be ended. In case that the corresponding timer has expired, the UE may start the reestablishment procedure.

TABLE 1

| T316 | Upon transmission of the MCGFailureInformation message | Upon resumption of MCG transmission, upon reception of RRCRelease, or upon initiating the reestablishment procedure, | Perform the actions as specified in 5.7.3b.5. |
|---|---|---|---|

In the RRC Connection re-establishment procedure that occurs due to the above cause, the UE may perform a cell selection, MAC reset, radio bearer (RB) suspension, or PDCP reestablishment. Further, in case that the RRC connection reestablishment procedure starts, the UE operates the T311 timer, and during the operation of the timer, a radio link recovery operation is not performed. If the RRC connection reestablishment is not performed during the operation of the timer, and then the timer expires, the UE may be transitioned to an RRC IDLE state. The disclosure proposes an operation of discarding a segmented RRC message that is stored in an RRC layer of the UE at step 725 by distinguishing for what reason the RRC connection reestablishment procedure has been triggered additionally although the RRC connection reestablishment procedure has been performed due to the above causes, and due to this, a PDCP reestablishment operation has been performed. The segmented RRC message being discarded may correspond to a downlink segmented RRC message, an uplink segmented RRC message, or both of them. As an example, the RRC message that is not transferred to the PDCP layer, but is stored in the RRC layer may be discarded. In addition, the base station may discard the segmented RRC message stored in the RRC layer in the same manner as the UE at the corresponding operation.

Figure 8:
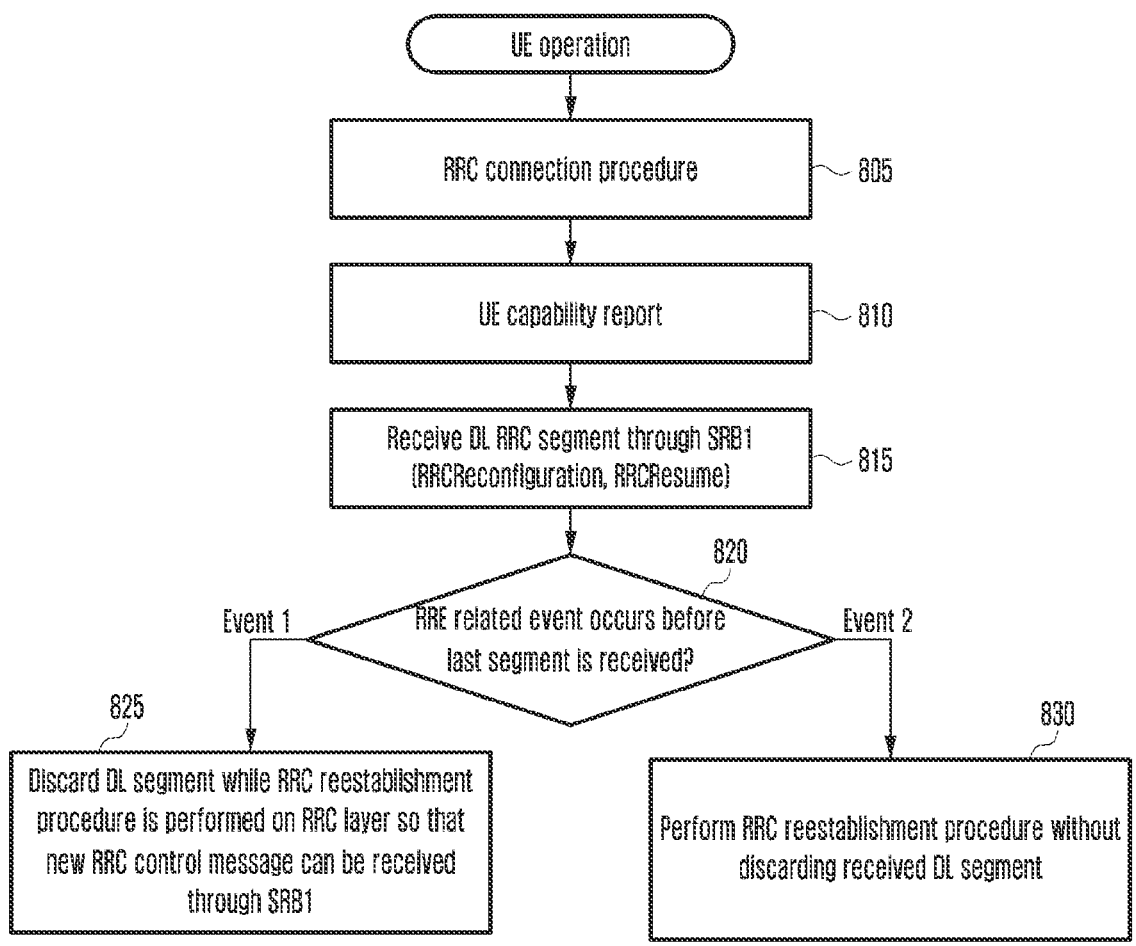
FIG. 8 is a diagram illustrating an operation of a UE for processing a downlink segment RRC message for each event when an event related to RRC reestablishment occurs as a first embodiment of the disclosure.

FIG. 8 is a diagram illustrating an operation of a UE for processing a downlink segment RRC message for each event when an event related to RRC reestablishment occurs as a first embodiment of the disclosure.

At step 805, the UE performs an RRC connection procedure with a serving base station, and performs a procedure of reporting capability supported by the UE to the corresponding base station. That is, at step 810, the UE may receive a request (UECapabilityEnquiry message) for report of UE capability information from the base station, and the message may include filtering information (RAT type or frequency information) of the UE capability information. If the UECapabilityEnquiry message is received, the UE stores and transfers the UE capability information, and particularly in the disclosure, an indicator that indicates whether to support segmentation of a downlink RRC message may be included. This may be transferred by 1-bit signaling that is the UE entire capability, or 1-bit indicator may be included for each RAT type. Through the reception of the corresponding indicator, the base station can identify that the corresponding UE can receive and recover the downlink segmented RRC message.

At operation 815, the UE may receive, from the base station, a downlink segmented RRC message (DLDedicatedMessageSegment) in which an RRCReconfiguration message or an RRCResume message is segmented, and at step 820, the UE may perform a different operation at the corresponding operation in case that the RRC reestablishment occurs due to occurrence of a specific event in a state where the segmented RRC message especially corresponding to the last segment indicator is not received while the segmented RRC message is received. That is, the RRC reestablishment may occur due to the causes as described above with reference to FIG. 7, and the operation of the UE may differ depending on the causes of the event occurrence. The operation defined in the disclosure is an operation whether to discard the segment of the downlink or uplink RRC message stored on the RRC layer of the UE when the corresponding RRC reestablishment occurs. Although the RRC reestablishment has occurred due to the corresponding cause, the corresponding link can be reused in a specific situation, and thus the RRC segment stored in the RRC layer may be stored without being discarded. As another example, if the RRC reestablishment occurs, the corresponding link is initialized, and thus it is necessary to discard all RRC segments stored on the RRC layer.

In Table 2 below, operations on the UE RRC layer due to the cause of RRC reestablishment (RRE) occurrence are summarized.

procedure, the UE may determine whether to discard or keep the RRC segment for each cause. The UE operation for each cause refers to Table 2 above. It may be assumed that the cause of discarding the RRC segment is defined as event 1, and the cause of not discarding the RRC segment is defined as event 2. In case that the cause of the RRE procedure is event 1, the UE, at step 825, may discard the DL segment that is received at a UE initial operation while the RRC reestablishment procedure is performed on the RRC layer so that a new RRC control message can be received through SRB1. In contrast, in case that the cause of the RRE procedure is event 2, the UE, at operation 830, may perform the RRC reestablishment procedure without discarding the received DL segment. That is, the UE may keep the DL segment stored on the RRC layer, and then may reuse the same in the message. As an example, since the corresponding stored RRC segments have their own serial numbers, it is possible to transfer the segment following the previously sent segment through the network, and the UE may distinguish this. Further, the same operation may be commonly applied to all the causes of triggering the RRC reestablishment procedure. The operation at this time is to discard all the RRC segmented messages stored on the RRC layer in

TABLE 2

| Cause of RRE occurrence | Operation on UE RRC layer | Supplementary explanation |
| --- | --- | --- |
| First cause: MCG RLF | Discard RRC segments | In case of MCG RLF occurrence, reestablishment for a corresponding link is executed, and it is necessary to delete a stored segment. |
| Second cause: MCG reconfiguration with sync failure (e.g. T304 expiration) | Not discard RRC segments (keep RRC segments) | In case of failure of handover (HO) or PSCell change to a target, fallback to the original MCG link is necessary, and thus segment is not deleted. |
| Third cause: Mobility failure from NR | Not discard RRC segments (keep RRC segments) | Fallback to the original MCG link is necessary, and thus segment is not deleted. |
| Fourth cause: MCG integrity protection(IP) check failure for SRB1/SRB2 | Discard RRC segments | If IP check of all segments has succeeded, the corresponding PDU is discarded after being assembled and processed, whereas if IP check of even one of segments has failed, all segments are discarded without assembling. When the IP check failure occurs, SRB1/SRB2 is discarded, and SRB3 is not discarded. |
| Fifth cause: RRC reestablishment failure | Discard RRC segments | Since an RRC reconfiguration message is received, and the corresponding configuration is unable to be applied, the stored segment may not exist, and in this case, the discard operation may be excluded through embodiment. |
| Sixth cause: SCG RLF | Discard RRC segments | Since MCG is suspended, all links are reestablished, and thus discard is necessary. |
| Seventh cause: SCG reconfiguration with sync failure | Discard RRC segments | Since MCG is suspended, all links are reestablished, and thus discard is necessary. |
| Eighth cause: SCG reestablishment failure | Discard RRC segments | Since MCG is suspended, all links are reestablished, and thus discard is necessary. |
| Ninth cause: SCG integrity protection check failure | Discard RRC segments | Since MCG is suspended, all links are reestablished, and thus discard is necessary. |
| Tenth cause: Integrity protection (IP) check failure for SRB3 | Not discard RRC segments (keep RRC segments) | When IP check failure occurs, SRB1/SRB2 is discarded, and SRB3 is not discarded. |
| Eleventh failure: T316 expiration | Discard RRC segments | In case of MCG RLF occurrence, reestablishment for the corresponding link is executed, and thus deletion of the stored segment is necessary. |

Figure 9:
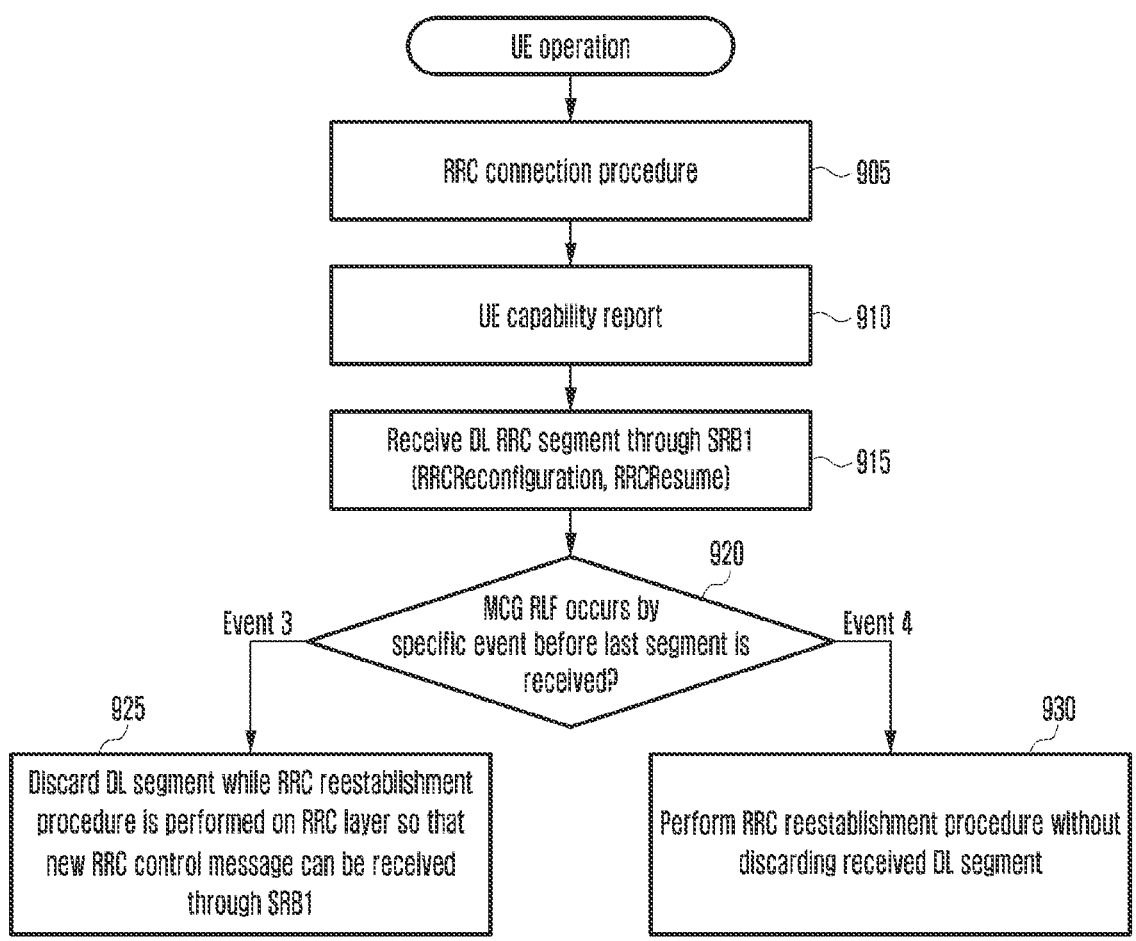
FIG. 9 is a diagram illustrating an operation of a UE for processing a downlink segment RRC message for each event when an event related to RRC reestablishment occurs in a state where a master cell group (MCG) fast recovery is configured as a second embodiment of the disclosure.

At step 820, the UE may perform the RRC reestablishment procedure due to the causes arranged in Table 2 as above, and as an initial UE operation for the corresponding case that the RRC reestablishment procedure is triggered regardless of the causes of the occurrence. FIG. 9 is a diagram illustrating an operation of a UE for processing a downlink segment RRC message for each event when an event related to RRC reestablishment occurs in a state where a master cell group (MCG) fast recovery is configured as a second embodiment of the disclosure.

In general, in case that RLF occurs in MCG, the RRC reestablishment operation is performed, whereas in case that MCG fast recovery is configured, the data transmission/reception may be performed through an SCG path other than performing the RRC reestablishment if it is determined that the data transmission/reception through the SCG path is smooth even in case that the RLF occurs in the MCG.

At step 905, the UE performs an RRC connection procedure with a serving base station, and performs a procedure of reporting capability supported by the UE to the corresponding base station. That is, at operation 910, the UE may receive a request (UECapabilityEnquiry message) for report of UE capability information from the base station, and the message may include filtering information (RAT type or frequency information) of the UE capability information. If the UECapabilityEnquiry message is received, the UE stores and transfers the UE capability information, and particularly in the disclosure, an indicator that indicates whether to support segmentation of a downlink RRC message may be included. This may be transferred by 1-bit signaling that is the UE entire capability, or 1-bit indicator may be included for each RAT type. Through the reception of the corresponding indicator, the base station can identify that the corresponding UE can receive and recover the downlink segmented RRC message.

At step 915, the UE may receive, from the base station, a downlink segmented RRC message (DLDedicatedMessageSegment) in which an RRCReconfiguration message or an RRCResume message is segmented, and at step 920, the UE may perform a different operation at the corresponding operation in case that the RRC reestablishment occurs due to occurrence of a specific event in a state where the segmented RRC message especially corresponding to the last segment indicator is not received while the segmented RRC message is received. That is, the RRC reestablishment may occur due to the causes as described above with reference to FIG. 7, and the operation of the UE may differ depending on the causes of the event occurrence. The operation defined in the disclosure is an operation whether to discard the segment of the downlink or uplink RRC message stored on the RRC layer of the UE when the corresponding RRC reestablishment occurs. Although the RRC reestablishment has occurred due to the corresponding cause, the corresponding link can be reused in a specific situation, and thus the RRC segment stored in the RRC layer may be stored without being discarded. As another example, if the RRC reestablishment occurs, the corresponding link is initialized, and thus it is necessary to discard all RRC segments stored on the RRC layer.

In particular, the second embodiment specifies the UE operation in the state where the MCG fast recovery is configured, and may correspond to causes 6, 7, 8, and 9 among causes of the RRE occurrence. The UE operation is different from the operation in FIG. 8 on the point that when the causes 6, 7, 8, and 9 occur in the corresponding MCG suspend state, the situation where the MCG suspension is recovered has been considered, and in this case, it is necessary to keep the stored RRC segment since it is possible to reuse the link to the MCG.

At step 920, the UE operation may differ in case that the MCG RLF occurs before the UE receives the last segment, and the causes 6, 7, 8, and 9 arranged in Table 2 above occur. If a case where the existing MCG RLF occurs and the MCG failure procedure is triggered is defined as event 3, and event 3 occurs, the UE, at step 925, may discard the DL segment as the UE initial operation during performing the RRC reestablishment procedure on the RRC layer so that a new RRC control message is received through SRB1. This operation is the same as the operation as described above for the causes 6, 7, 8, and 9 in FIG. 8. In contrast, if it is assumed that a state where the MCG link is recovered is event 4 in a situation where the fast MCG recovery is configured in the existing MCG RLF occurrence event, and the PSCell change is not under ongoing, and the SCG transmission is not suspended, when event 4 occurs, the UE, at step 930, may perform the RRC reestablishment procedure without discarding the received DL segment. That is, the DL segment stored in the RRC layer may be maintained, and then may be reused in the message.

As an example, since the stored RRC segments have their own serial numbers, it is possible to transfer the remaining segment following the previously sent segment through the network, and the UE may distinguish this.

Figure 10:
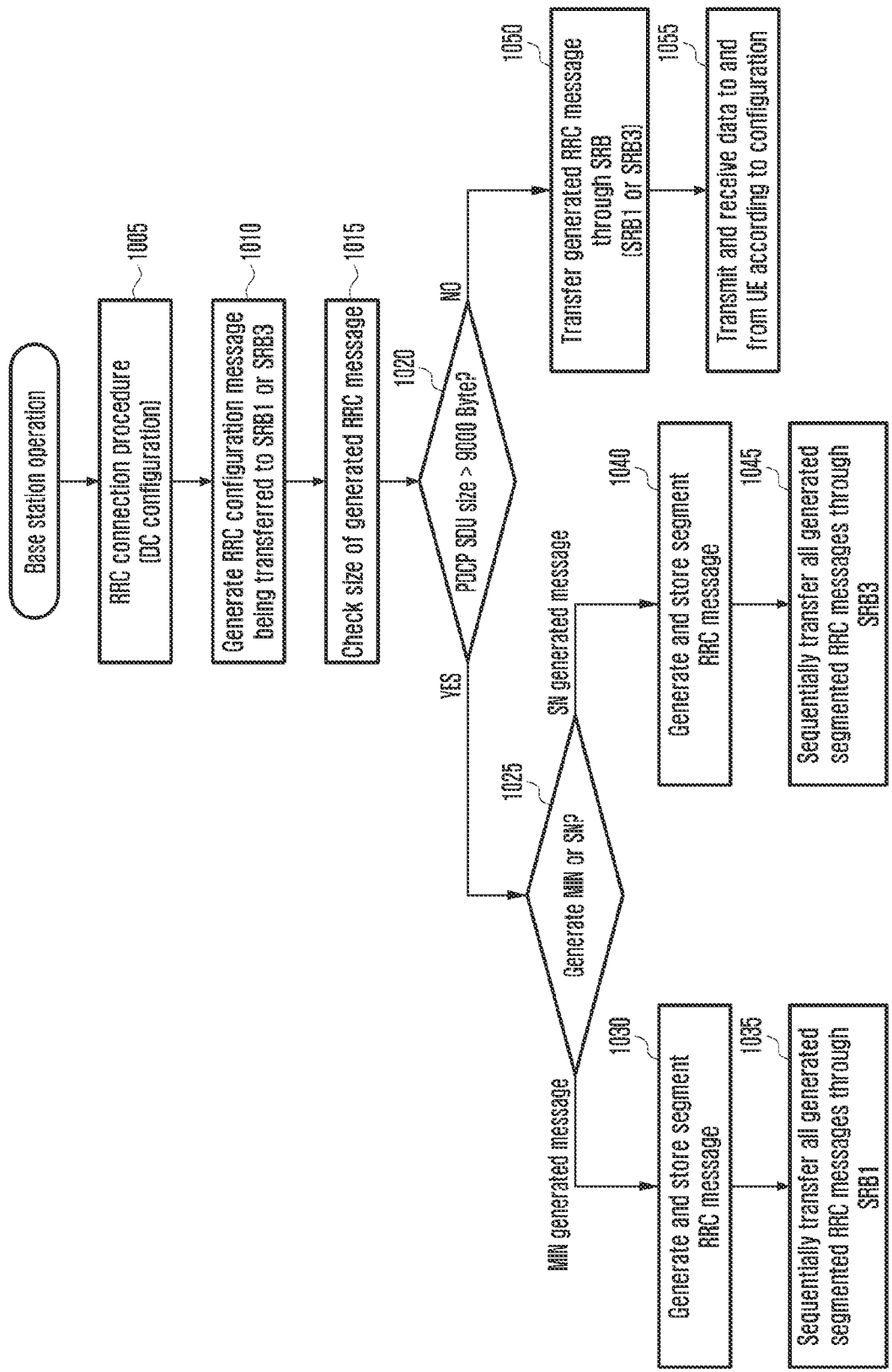
FIG. 10 is a diagram illustrating an operation of a base station according to an embodiment of the disclosure.

FIG. 10 is a diagram illustrating an operation of a base station according to an embodiment of the disclosure.

At step 1005, a serving base station (eNB or gNB) may establish a connection procedure with a UE, and at this operation, the DC may be configured, and the MN and the SN may be connected to the UE. At step 1010, the base station may determine to transfer the RRCReconfiguration message to the UE, and may generate the corresponding information.

In a state where dual connectivity (hereinafter, named "DC") is configured as shown in FIG. 10, the following cases may occur depending on how the RRCReconfiguration message is transferred.

Case 1: In case that a master node (MN) generates an RRC message including MCG configuration information, the base station may transfer the generated RRC message through SRB1.

Case 2: In case that the MN is transferred with secondary node (SN) configuration information and generates the RRC message including MCG/SCG configuration information, the base station may transfer the generated RRC message through SRB1.

Case 3: In case that the SN generates the RRC message including SCG configuration information, the base station may transfer the generated RRC message through SRB3.

At step 1015, the base station may identify whether the RRC control message generated at step 1010 exceeds 9000 bytes that correspond to the maximum size of the PDCP SDU (1020), and if the size of the generated RRC message exceeds the 9000 bytes, the base station may identify whether the corresponding message is generated from the MN or the SN at step 1025. In case of the message generated from the MN, at operation 1030, the base station may generate and store a segmented RRCReconfiguration message in a DLDedicatedMessageSegment, and may transfer, to the SRB1, a plurality of DLDedicatedMessageSegment messages that accommodate all of the entire RRCReconfiguration messages. In this case, the messages can be sequentially transferred through the SRB1 without interrupting another DL RRC message. If the message is a message generated from the SN as a result of identifying a message generation node at operation 1025, that is, if the message is the RRC message for the SN, and SRB3 is configured, the base station, at step 1040, may store and generate the segmented RRCReconfiguration message in the DLDedicatedMessageSegment, and then may transfer, to the SRB3, a plurality of DLDedicatedMessageSegment messages that accommodate all of the entire RRCReconfiguration messages. In this case, the messages can be sequentially transferred through SRB3 without interrupting another DL RRC message.

If the size of the corresponding message is smaller than 9000 bytes as the result of identifying the downlink RRC message generated at step 1020, the base station may transfer the generated RRC message through the SRB that generates the corresponding message. Thereafter, at step 1055, data transmission/reception may be performed based on the information configured with the UE.

Figure 11:
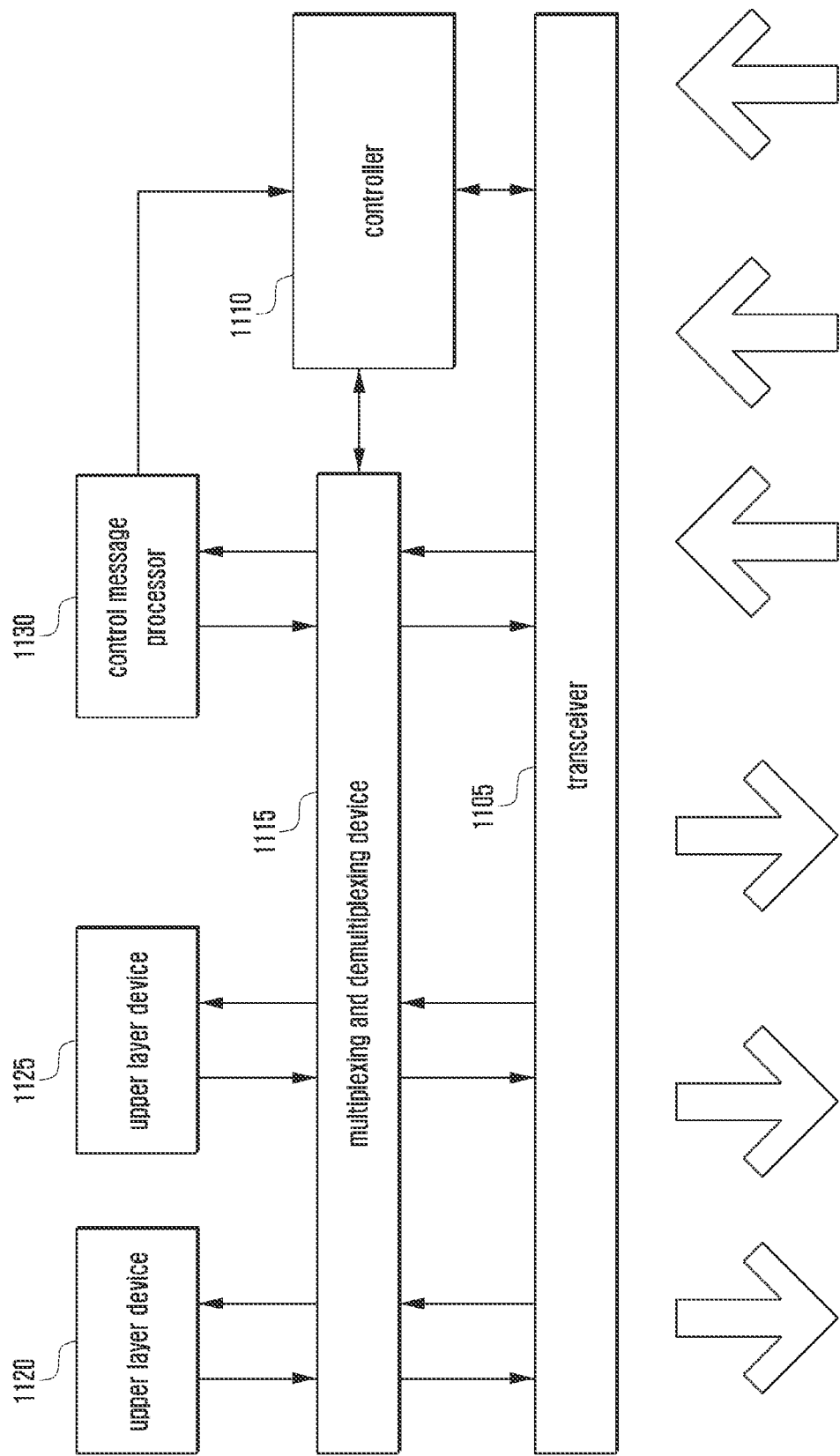
FIG. 11 is a diagram illustrating a block configuration of the UE according to an embodiment of the disclosure.

FIG. 11 is a diagram illustrating a block configuration of the UE according to an embodiment of the disclosure.

As illustrated in FIG. 11, a terminal according to an embodiment of the disclosure may include a transceiver 1105, a controller 1110, a multiplexer/demultiplexer 1115, various kinds of higher layer processors 1120 and 1125, and a control message processor 1130.

The transceiver 1105 may receive data and a specific control signal on a forward channel of a serving cell, and may transit the data and the specific control signal on a backward channel. If a plurality of serving cells are configured, the transceiver 1105 may perform transmission and reception of the data and the control signal through the plurality of serving cells. The multiplexer/demultiplexer 1115 may serve to multiplex data generated by the higher layer processors 1120 and 1125 or the control message processor 1130, to demultiplex the data received through the transceiver 1105, and to transfer the multiplexed or demultiplexed data properly to the higher layer processors 1120 and 1125 or the control message processor 1130. The control message processor 1130 may take a necessary operation through transmitting and receiving a control message from a base station. Here, the control message processor may include functions of processing a control message, such as an RRC message and MAC CE, and performing a report of a CBR measurement value, and receiving an RRC message for a resource pool and the terminal operation. The higher layer processor 1120 or 1125 means a DRB device, and it may be configured for each service. The higher layer processor may process data generated through a user service, such as a file transfer protocol (FTP) or voice over Internet protocol (VoIP), and may transfer the processed data to the multiplexer/demultiplexer 1115, or process data transferred from the multiplexer/demultiplexer 1115 and transfer the processed data to a service application of a higher layer. The controller 1110 may control the transceiver 1105 and the multiplexer/demultiplexer 1115 to identify scheduling commands, for example, backward grants, received through the transceiver 1105 and to perform backward transfer thereof as proper transfer resources at a proper time. On the other hand, although it has been described that the terminal is composed of a plurality of blocks and the blocks perform different functions, this is merely exemplary, and the embodiment is not limited thereto. For example, the controller 1110 may perform the function performed by the demultiplexer 1115.

Figure 12:
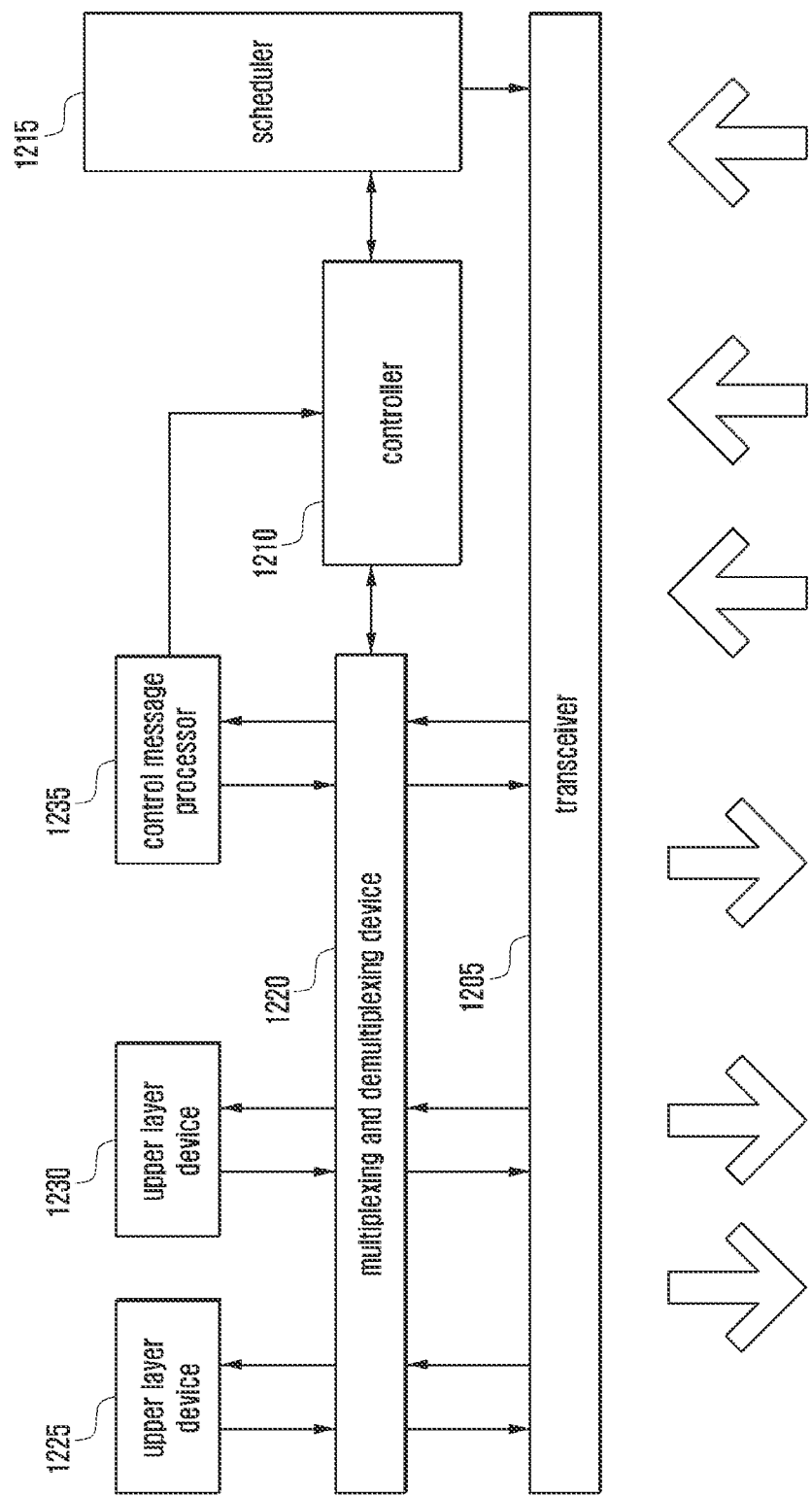
FIG. 12 is a diagram illustrating a block configuration of a base station according to an embodiment of the disclosure.

FIG. 12 is a diagram illustrating a block configuration of a base station according to an embodiment of the disclosure.

A base station of FIG. 12 may include a transceiver 1205, a controller 1210, a multiplexer/demultiplexer 1220, a control message processor 1235, various kinds of higher layer processors 1225 and 1230, and a scheduler 1215.

The transceiver 1205 may transmit data and a specific control signal on a forward carrier, and may receive the data and the specific control signal on a backward carrier. The multiplexer/demultiplexer 1220 may serve to multiplex data generated by the higher layer processors 1225 and 1230 or the control message processor 1235, to demultiplex the data received through the transceiver 1205, and to transfer the multiplexed or demultiplexed data properly to the higher layer processors 1225 and 1230, the control message processor 1235, or the controller 1210. The control message processor 1235 may generate a message to be transferred to the terminal and may transfer the generated message to a lower layer.

The higher layer processors 1225 and 1230 may be configured for each terminal and for each service. The higher layer processors 1225 and 1230 may process data generated in a user service, such as FTP or VoIP and transfer the generated data to the multiplexer/demultiplexer 1220, or may process data transferred from the multiplexer/demultiplexer 1220 and may transfer the processed data to a service application of a higher layer. The scheduler 1215 may allocate a transmission resource to the terminal at proper time in consideration of the terminal buffer state, channel state, and terminal active time, may process the signal transmitted from the terminal to the transceiver, or may transmit the signal to the terminal.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form. The embodiments described in this specification have been individually described, but two or more of the embodiments may be combined and practiced.

Although the detailed embodiments have been described in the detailed description of the disclosure, the disclosure may be modified in various ways without departing from the scope of the disclosure. Accordingly, the scope of the disclosure should not be limited to the above-described embodiments, but should be defined by not only the claims, but equivalents thereof.

The invention claimed is:

1. A method performed by a user equipment (UE) in a wireless communication system, the method comprising:
    receiving, from a base station, a segment of a segmented radio resource control (RRC) message;
    identifying whether an RRC re-establishment (RRE) has occurred before receiving the last segment of the segmented RRC message; and
    in case that the RRE has occurred before receiving the last segment of the segmented RRC message, determining whether to discard or maintain the received segment of the segmented RRC message based on a cause of the RRE,
    wherein the received segment of the segmented RRC message is discarded in case that a master cell group (MCG) integrity protection (IP) check failure for a signaling radio bearer 1 (SRB1) or a signaling radio bearer 2 (SRB2) has occurred, and
    wherein the received segment of the segmented RRC message is maintained in case that an IP check failure for a signaling radio bearer 3 (SRB3) has occurred.

2. The method of claim 1, wherein the received segment of the segmented RRC message is discarded in case that an RRE failure, a radio link failure (RLF) in a secondary cell group (SCG), an SCG reconfiguration with sync failure, an SCG reestablishment failure, or an SCG integrity protection check failure has occurred.

3. The method of claim 1, wherein the received segment of the segmented RRC message is maintained in case that an MCG reconfiguration with sync failure a mobility failure from a new radio (NR) has occurred.

4. The method of claim 1, further comprising:
receiving, from the base station, a UE capability enquiry message; and
based on the UE capability enquiry message, transmitting, to the base station, UE capability information including an indicator indicating whether the UE supports the segmented RRC message.

5. A method performed by a base station in a wireless communication system, the method comprising:
transmitting, to a user equipment (UE), a UE capability enquiry message;
based on the UE capability enquiry message, receiving, from the UE, UE capability information including an indicator indicating whether the UE supports a segmented RRC message, and
transmitting, to the UE, a segment of the segmented radio resource control (RRC) message,
wherein in case that an RRC re-establishment (RRE) has occurred before transmitting the last segment of the segmented RRC message, whether to discard or maintain the transmitted segment of the segmented RRC message is determined based on a cause of the RRE,
wherein the received segment of the segmented RRC message is discarded in case that a master cell group (MCG) integrity protection (IP) check failure for a signaling radio bearer 1 (SRB1) or a signaling radio bearer 2 (SRB2) has occurred, and
wherein the received segment of the segmented RRC message is maintained in case that an IP check failure for a signaling radio bearer 3 (SRB3) has occurred.

6. The method of claim 5, wherein the received segment of the segmented RRC message is discarded in case that an RRE failure,
a radio link failure (RLF) in a secondary cell group (SCG), an SCG reconfiguration with sync failure, or an SCG reestablishment failure, an SCG integrity protection check failure has occurred.

7. The method of claim 5, wherein the received segment of the segmented RRC message is maintained in case that an MCG reconfiguration with sync failure or a mobility failure from a new radio (NR) has occurred.

8. A user equipment (UE) in a wireless communication system, the UE comprising:
a transceiver; and
a controller coupled with the transceiver, and configured to:
receive, from a base station, a segment of a segmented radio resource control (RRC) message,
identify whether an RRC re-establishment (RRE) has occurred before receiving the last segment of the segmented RRC message, and
in case that the RRE has occurred before receiving the last segment of the segmented RRC message, determine whether to discard or maintain the received segment of the segmented RRC message based on a cause of the RRE,
wherein the received segment of the segmented RRC message is discarded in case that a master cell group (MCG) integrity protection (IP) check failure for a signaling radio bearer 1 (SRB1) or a signaling radio bearer 2 (SRB2) has occurred, and
wherein the received segment of the segmented RRC message is maintained in case that an IP check failure for a signaling radio bearer 3 (SRB3) has occurred.

9. The UE of claim 8, wherein the received segment of the segmented RRC message is discarded in case that an RRE failure,
a radio link failure (RLF) in a secondary cell group (SCG), an SCG reconfiguration with sync failure, an SCG reestablishment failure, or an SCG integrity protection check failure has occurred.

10. The UE of claim 8, where the received segment of the segmented RRC message is maintained in case that an MCG reconfiguration with sync failure or a mobility failure from a new radio (NR) has occurred.

11. The UE of claim 8, wherein the controller is further configured to: receive, from the base station, a UE capability enquiry message; and based on the UE capability enquiry message, transmit, to the base station, UE capability information including an indicator indicating whether the UE supports the segmented RRC message.

12. A base station in a wireless communication system, the base station comprising:
a transceiver, and
a controller coupled with the transceiver, and configured to:
transmit, to a user equipment (UE), a UE capability enquiry message,
based on the UE capability enquiry message, receive, from the UE, UE capability information including an indicator for indicating whether the UE supports a segmented RRC message, and
transmit, to the UE, a segment of the segmented radio resource control (RRC) message,
wherein in case that an RRC re-establishment (RRE) has occurred before transmitting the last segment of the segmented RRC message, whether to discard or maintain the transmitted segment of the segmented RRC message is determined based on a cause of the RRE,
wherein the received segment of the segmented RRC message is discarded in case that a master cell group (MCG) integrity protection (IP) check failure for a signaling radio bearer 1 (SRB1) or a signaling radio bearer 2 (SRB2) has occurred, and
wherein the received segment of the segmented RRC message is maintained in case that an IP check failure for a signaling radio bearer 3 (SRB3) has occurred.

13. The base station of claim 12, wherein the received segment of the segmented RRC message is discarded in case that an RRE failure,
a radio link failure (RLF) in a secondary cell group (SCG), an SCG reconfiguration with sync failure, an SCG reestablishment failure, or an SCG integrity protection check failure has occurred.

14. The base station of claim 12, wherein the received segment of the segmented RRC message is maintained in case that an MCG reconfiguration with sync failure or a mobility failure from a new radio (NR) has occurred.

* * * * *